UNITED STATES PATENT OFFICE.

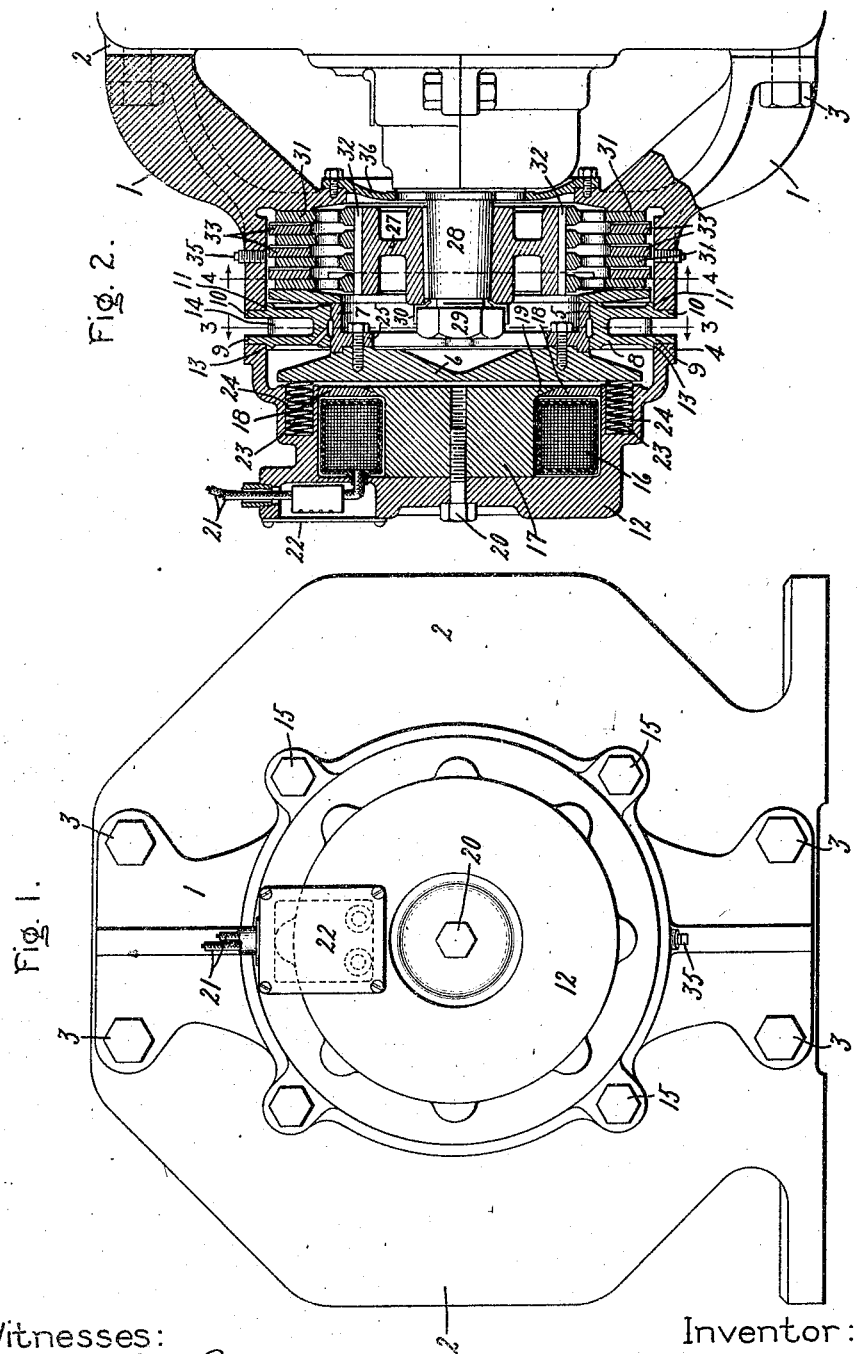
E. W. ROBINSON.
MAGNETIC BRAKE.
APPLICATION FILED DEC. 17, 1908.
1,046,024.
Patented Dec. 3, 1912.
2 SHEETS—SHEET 1.
Witnesses:
George W. Tilden
J. Ellis Elen.
Inventor:
Edward W. Robinson,
by Albert H. Davis
Att'y.

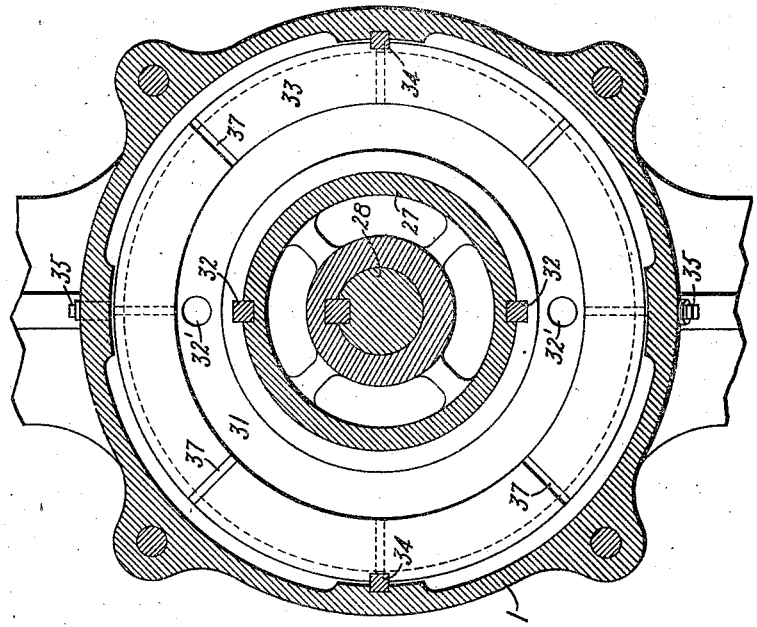
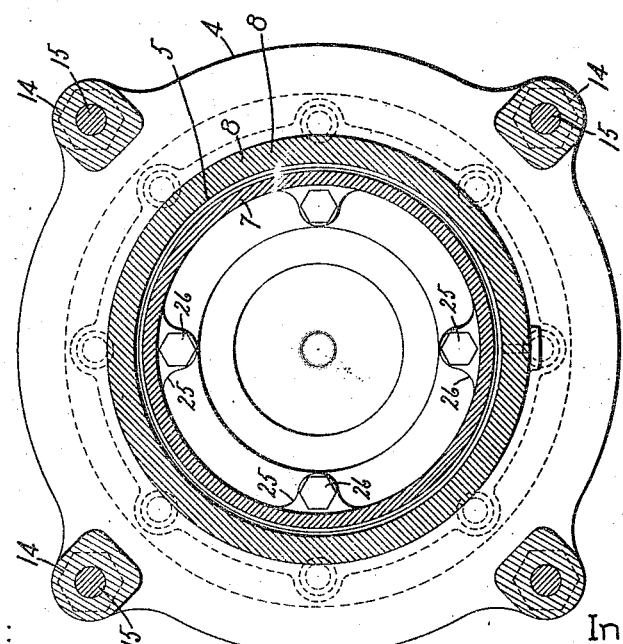

EDWARD W. ROBINSON, OF SCHENECTADY, NEW YORK, ASSIGNOR TO GENERAL ELECTRIC COMPANY, A CORPORATION OF NEW YORK.

MAGNETIC BRAKE.

1,046,024. Specification of Letters Patent. Patented Dec. 3, 1912.

Application filed December 17, 1908. Serial No. 467,999.

*To all whom it may concern:*

Be it known that I, EDWARD W. ROBINSON, a subject of the King of Great Britain, residing at Schenectady, county of Schenectady, State of New York, have invented certain new and useful Improvements in Magnetic Brakes, of which the following is a specification.

My invention relates to magnetic brakes and more particularly to such brakes of the magnetically released type and has for its object a novel arrangement and construction of parts.

The various features of novelty which characterize my invention are pointed out with particularity in the claims annexed to and forming a part of this specification. For a better understanding of my invention, however, reference may be had to the following description, taken in connection with the accompanying drawings, in which—

Figure 1 is an end elevation of a magnetic brake embodying my invention; Fig. 2 is a cross-sectional view; Fig. 3 is a sectional view taken on the line 3—3 of Fig. 2, and Fig. 4 is a sectional view on the line 4—4 of Fig. 2, looking in the direction of the arrows.

Referring to the drawings, the frame 1 of my brake is fastened to the end member 2 of a dynamo-electric machine by means of bolts 3. The magnet is supported by a member 4. This supporting member has an internal guiding surface 5, which is preferably cylindrical. The armature 6 of the magnet is operatively associated with the cylindrical thrust ring 7, which is preferably made of non-magnetic material, is guided by the surface 5 and is also operatively associated with the two sets of friction disks, one set of which is stationary and the other rotatable. It will thus be seen that my brake combines with the dynamo-electric machine to form a compact and simple structure.

The supporting member 4 comprises an annular portion 8, of less diameter than the internal diameter of the frame 1, the interior of which forms the guiding surface 5 for the thrust ring, and two flange portions 9 and 10. Each flange has a shoulder, the frame 1 engaging the shoulder 11 on the flange 10 and the frame 12 of the magnet engaging the shoulder 13 on the flange 9. These flanges are held rigid by means of the portions of metal 14 and bolts 15, which pass through the frame 12 of the magnet, the portions 14 of the supporting member and into the frame 1 of the brake, and thus the magnet is supported entirely from the end members of the dynamo-electric machine. This supporting member also separates the magnet from the friction disks, and by constructing it with flanges as described, a large cooling surface is supplied near the friction disks which generate considerable heat.

The magnet consists of the armature 6, the frame 12 in which is placed the exciting coil 16, and the member 17, which is surrounded by the coil 16 and is made of magnetic material. The coil 16 is inclosed in a watertight non-magnetic casing and is held in place by means of the member 17 and the bronze ring 18. This member 17 has a flange portion 19 which fits over a portion of the ring 18 and by tightening the bolt 20, the member 17 and ring 18 together with the coil 16 are securely fastened to the magnet frame 12. The coil is excited from some source through the leads 21, which enter the inclosed terminal box 22 formed in the magnet frame. Springs 23 are placed in holes 24 and press upon the armature 6 near its periphery. The flux produced by the coil 16 passes through the member 17 into the armature and returns through the magnet frame. The thrust ring is preferably an annular ring formed with projections 25. Bolts 26 pass through these projections and fasten the ring 7 to the magnet armature.

A spider 27 is keyed on the shaft 28 and kept from moving by the nut 29 and lock washer 30. Friction disks 31 are slidably mounted on the keys 32 on the spider 27, so that they rotate with the spider and shaft. These plates are provided with holes 32' to facilitate their removal, if necessary. Between the rotatable disks 31 there are stationary friction disks 33 which are slidably mounted on keys 34 in the frame 1. These disks 33 are provided with oil grooves 37. The stationary disk nearest to the supporting member 4 extends inwardly farther than the other stationary disks, and has the thrust ring 7 pressing against it near its inner periphery.

Oil plugs 35 are provided in the frame so that oil may be supplied to and removed from the friction disks. A cover 36 is provided which is fastened to the frame 1 and incloses the brake at the motor bearing end of the brake. It will thus be seen that my brake is entirely inclosed and, when used in connection with an inclosed motor, may be partially or entirely submerged in water without affecting its operation or permitting water to enter it.

The magnet coil is so designed that with a certain amount of current flowing through it, the armature 6 will be attracted toward the member 17 and frame 12 against the action of the springs 23, and the shaft 28 with the disks 31 is free to rotate without any interference from the disks 33. When, however, the circuit of the coil is opened, the springs 23 force the armature 6 away from the member 17 and the frame, and the thrust ring 7, pressing against the outside stationary disk, transmits the pressure of the springs to all the disks, forces them all together, and exerts a braking force on the shaft 28.

I have described the supporting member 4 and the thrust ring 7 as being annular in shape, but it is evident to those skilled in the art that these parts may assume any shape, and I aim in the appended claims to cover all modifications of my brake which do not depart from the spirit and scope of my invention.

What I claim as new and desire to secure by Letters Patent of the United States, is,—

1. In combination, a frame for a magnetic brake, a plurality of friction disks slidably but non-rotatably mounted in said frame, a shaft, a plurality of slidable friction disks mounted on said shaft and rotatable therewith, a magnet comprising an armature and a frame, a supporting member for said magnet fastened to said frame and having an internal guiding surface, a cylindrical thrust ring guided by said surface, said thrust ring pressing against the non-rotatable disk nearest the supporting frame near its inner periphery, and means for pressing the disks together to oppose the action of said magnet.

2. In combination, a frame for a magnetic brake, a plurality of friction disks slidably but non-rotatably mounted in said frame, a shaft, a plurality of slidable friction disks mounted on said shaft and rotatable therewith, a magnet comprising an armature and a frame, a supporting member for said magnet fastened to said frame and having an internal guiding surface, a cylindrical thrust ring guided by said surface, said non-rotatable disk nearest said supporting member extending inwardly farther than the other of said non-rotatable disks and being pressed near its inner periphery by said thrust ring, and means for pressing the disks together to oppose the action of said magnet.

3. In combination, a brake frame, a plurality of friction disks slidably but non-rotatably mounted in said brake frame, a shaft, a plurality of slidable friction disks mounted on said shaft and rotatable therewith, a magnet comprising a frame and an armature, a supporting member for said magnet comprising a portion having a guiding surface and two flanged portions, one of said flanged portions being engaged by said brake frame and the other of said flanged portions being engaged by the frame of said magnet, a thrust ring guided by said surface and operatively associated with said armature and with said friction disks, and means for pressing said disks together to oppose the action of said magnet.

4. In combination a brake frame, a plurality of friction disks slidably but non-rotatably mounted in said brake frame, a shaft, a plurality of slidable friction disks mounted on said shaft and rotatable therewith, a magnet comprising a frame and an armature, a supporting member for said magnet comprising a portion having a guiding surface and two flanged portions, one of said flanged portions being engaged by said brake frame and the other of said flanged portions being engaged by said frame of the magnet, bolts passing through said flanged portions and said frames to hold said magnet in place, a thrust ring guided by said surface and operatively associated with said armature and with said friction disks, and means for pressing said disks together to oppose the action of said magnet.

5. In combination a brake frame, a plurality of friction disks slidably but non-rotatably mounted in said brake frame, a shaft, a plurality of friction disks mounted on said shaft and slidable therewith, a magnet comprising a frame and an armature, a supporting member for said magnet comprising a portion having a guiding surface and two flanged portions, one of said flanged portions being engaged by said brake frame and the other of said flanged portions being engaged by the frame of the magnet, bolts passing through said flanged portions and said frame to hold said magnet in place, a thrust ring guided by said surface and having projections, bolts passing through said projections for holding the thrust ring to said armature, said thrust ring being operatively associated with said friction disks, and means acting on said armature for pressing the disks together to oppose the action of said magnet.

6. In combination a brake frame, a plurality of friction disks slidably but non-rotatably mounted in said brake frame, a shaft, a plurality of friction disks mounted on said shaft and slidable therewith, a magnet comprising a frame and an armature, a supporting member for said magnet comprising a portion having a guiding surface and two flanged portions, one of said flanged portions being engaged by said brake frame and the other of said flanged portions being engaged by said frame of the magnet, bolts passing through said flanged portions and said frames to hold said magnet in place, a thrust ring guided by said surface fastened to said armature and operatively associated with said friction disks, and springs located in holes in the frame of said magnet and pressing on said armature near its periphery to oppose the action of said magnet.

7. In combination a brake frame, a plurality of friction disks slidably but non-rotatably mounted in said brake frame, a shaft, a plurality of friction disks mounted on said shaft and slidable therewith, a magnet comprising a frame and an armature, a supporting member for said magnet comprising a portion having a guiding surface and two flanged portions, one of said flanged portions being engaged by said brake frame and the other of said flanged portions being engaged by said frame of the magnet, bolts passing through said flanged portions and said frames to hold said magnet in place, a thrust ring guided by said surface and fastened to said armature, said thrust ring pressing against the non-rotatable disk nearest the supporting frame, and means acting on said armature for pressing the disks together to oppose the action of said magnet.

In witness whereof, I have hereunto set my hand this 15th day of December, 1908.

EDWARD W. ROBINSON.

Witnesses:
BENJAMIN B. HULL,
HELEN ORFORD.

---

Copies of this patent may be obtained for five cents each, by addressing the "Commissioner of Patents, Washington, D. C."